US008915701B2

(12) United States Patent
Black et al.

(10) Patent No.: US 8,915,701 B2
(45) Date of Patent: Dec. 23, 2014

(54) PIPING ASSEMBLY AND METHOD FOR CONNECTING INNER AND OUTER SHELL IN TURBINE SYSTEM

(75) Inventors: Kenneth Damon Black, Travelers Rest, SC (US); Matthew Stephen Casavant, Greenville, SC (US)

(73) Assignee: General Electric Company, Schenectady, NY (US)

( * ) Notice: Subject to any disclaimer, the term of this patent is extended or adjusted under 35 U.S.C. 154(b) by 629 days.

(21) Appl. No.: 13/227,907

(22) Filed: Sep. 8, 2011

(65) Prior Publication Data

US 2013/0064649 A1  Mar. 14, 2013

(51) Int. Cl.
*F01D 25/14* (2006.01)
*F02C 7/00* (2006.01)
*F01D 25/24* (2006.01)

(52) U.S. Cl.
CPC . *F02C 7/00* (2013.01); *F01D 25/14* (2013.01); *F01D 25/243* (2013.01); *F05D 2250/32* (2013.01); *F05D 2250/71* (2013.01)
USPC ........................................................ 415/116

(58) Field of Classification Search
CPC .................................. F01D 9/06; F01D 9/065
USPC .............. 415/182.1, 108, 116, 221, 177, 178, 415/179; 60/806
See application file for complete search history.

(56) References Cited

U.S. PATENT DOCUMENTS

| | | | | |
|---|---|---|---|---|
| 2,711,074 A | * | 6/1955 | Howard | 60/39.37 |
| 4,044,973 A | * | 8/1977 | Moorehead | 244/54 |
| 4,155,680 A | * | 5/1979 | Linko et al. | 415/144 |
| 4,290,456 A | * | 9/1981 | Ahrbeck | 138/109 |
| 5,167,487 A | * | 12/1992 | Rock | 415/173.3 |
| 5,593,274 A | | 1/1997 | Carreno et al. | |
| 6,382,906 B1 | | 5/2002 | Brassfield et al. | |
| 6,422,610 B1 | * | 7/2002 | Chang | 285/298 |
| 6,471,478 B1 | * | 10/2002 | Mashey | 416/96 R |
| 6,581,978 B2 | | 6/2003 | Li | |
| 7,007,488 B2 | | 3/2006 | Orlando et al. | |
| 7,530,603 B2 | * | 5/2009 | Fernandes et al. | 285/192 |
| 7,665,310 B2 | * | 2/2010 | Laborie | 60/806 |
| 2007/0261410 A1 | * | 11/2007 | Frank et al. | 60/785 |

OTHER PUBLICATIONS

"Pipe Drafting and Design" second edition, authored by Roy A. Parisher et al. and published by Gulf Professional Publishing 2000, pertinent pp. 55.*

* cited by examiner

*Primary Examiner* — Edward Look
*Assistant Examiner* — Kayla McCaffrey
(74) *Attorney, Agent, or Firm* — Dority & Manning, PA

(57) ABSTRACT

A piping assembly and a method for connecting an inner shell and an outer shell in a turbine system are disclosed. The piping assembly includes an inner fitting for connection to the inner shell and an outer fitting for connection to the outer shell. The piping assembly further includes an attenuation member extending between the inner fitting and the outer fitting and comprising an attenuation curve. The attenuation curve permits movement of the attenuation member in at least one of a longitudinal direction, a radial direction, or a tangential direction.

20 Claims, 8 Drawing Sheets

PIPING ASSEMBLY AND METHOD FOR CONNECTING INNER AND OUTER SHELL IN TURBINE SYSTEM

FIELD OF THE INVENTION

The present disclosure relates in general to turbine systems, and more particularly to piping assemblies between inner and outer shells in turbine systems.

BACKGROUND OF THE INVENTION

Turbine systems are widely utilized in fields such as power generation. For example, a conventional gas turbine system includes a compressor section, a combustor section, and at least one turbine section. The compressor section is configured to compress air as the air flows through the compressor section. The compressed air is then flowed from the compressor section to the combustor section, where it is mixed with fuel and combusted, generating a hot gas flow. The hot gas flow is provided to the turbine section, which utilizes the hot gas flow by extracting energy from it to power the compressor, an electrical generator, and/or other various loads.

Various sections of a turbine system, such as the compressor section and/or the turbine section, may include casings surrounding various internal components. For example, one or more sections may include an inner shell surrounding the various components and an outer shell spaced from and surrounding the inner shell. Linear pipes, such as tube seals, extend in a generally radial direction between the outer shell and inner shell. These pipes provide cooling flows from external to the shells, such as from the compressor section, to the components inside the shells.

However, the linear pipes that are currently utilized in many turbine systems have a variety of disadvantages. For example, many known pipes do not allow for movement between the respective inner and outer shells. When one of the shells moves with respect to the other due to, for example, differing rates of thermal growth, the pipes may resist this movement and leak or become damaged. Some known pipes allow for such movement through the use of spherical tube ends that are precision fitted into receptacles. However, such tube ends and receptacles are easily damaged and leakage prone, require wear coatings, and may be prohibitively expensive.

Thus, an improved piping assembly and method for connecting an inner and outer shell in a turbine system are desired in the art. Specifically, a piping assembly and a method that allow for movement of the inner and outer shells with respect to one another would be advantageous.

BRIEF DESCRIPTION OF THE INVENTION

Aspects and advantages of the invention will be set forth in part in the following description, or may be obvious from the description, or may be learned through practice of the invention.

In one embodiment, a piping assembly for connecting an inner shell and an outer shell in a turbine system is disclosed. The piping assembly includes an inner fitting for connection to the inner shell and an outer fitting for connection to the outer shell. The piping assembly further includes an attenuation member extending between the inner fitting and the outer fitting and comprising an attenuation curve. The attenuation curve permits movement of the attenuation member in at least one of a longitudinal direction, a radial direction, or a tangential direction.

In another embodiment, a method for connecting an inner shell and an outer shell in a turbine system is disclosed. The method includes connecting an inner fitting of a piping assembly to an inner shell. The piping assembly includes the inner fitting, an outer fitting, and an attenuation member extending therebetween. The outer fitting includes an outer flange, an insert, and an inner flange. The method further includes coupling the inner shell with an outer shell, inserting the insert of the piping assembly through the outer shell, and connecting the outer fitting to the outer shell.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
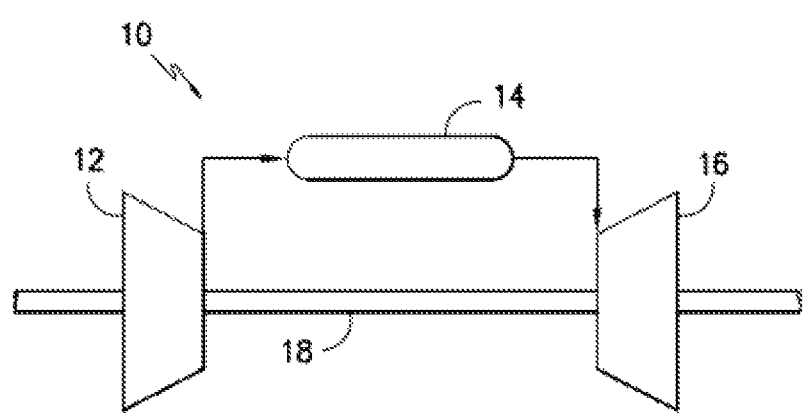
FIG. 1 is a schematic illustration of one embodiment of a turbine system according to the present disclosure.
Figure 2:
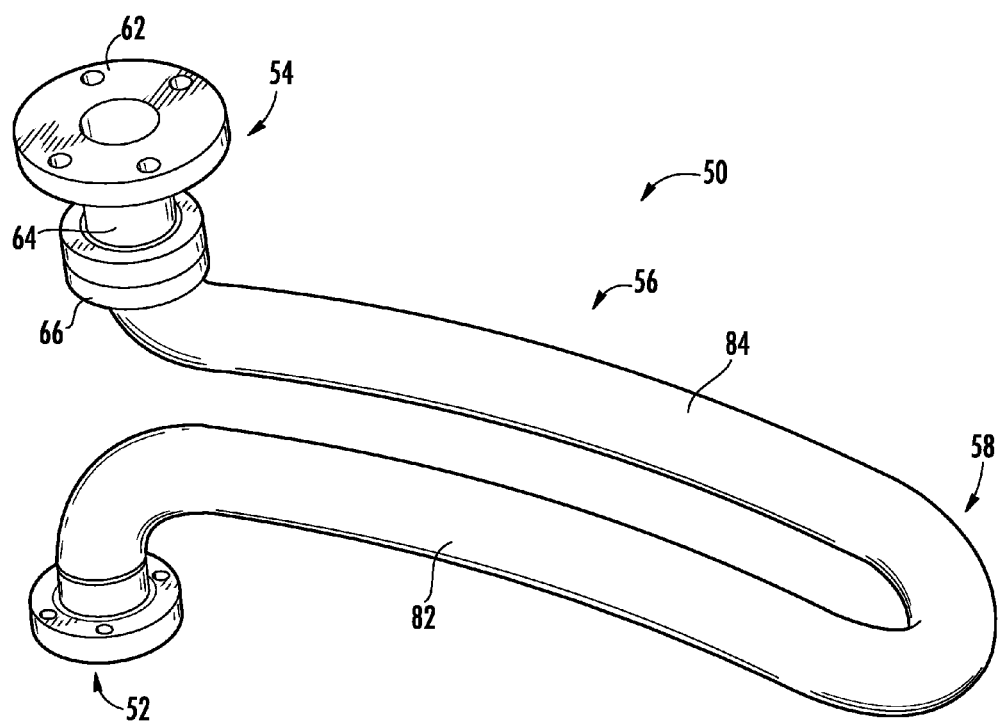
FIG. 2 is a perspective view of one embodiment of a piping assembly according to the present disclosure.
Figure 3:
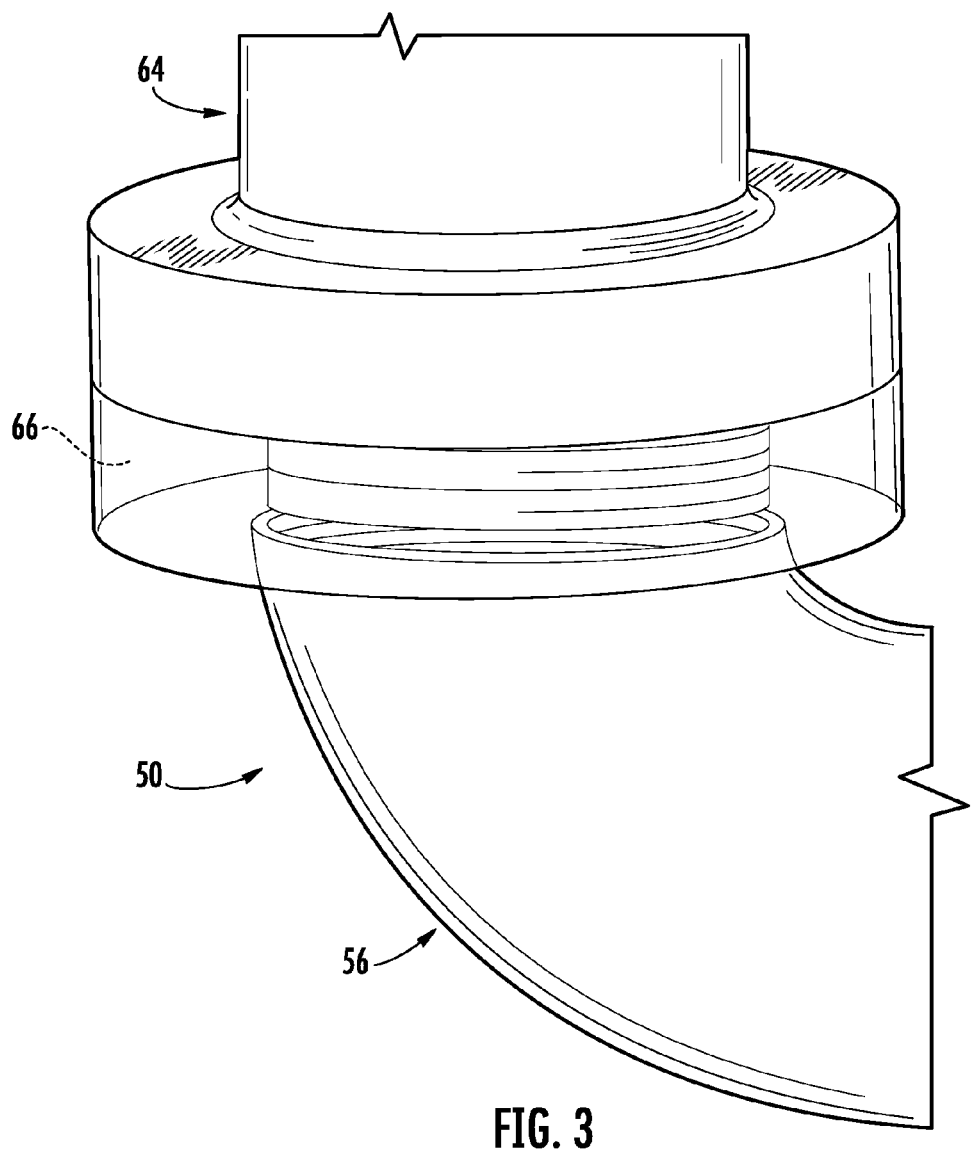
FIG. 3 is a close-up perspective view of one embodiment of a portion of an outer fitting of a piping assembly according to the present disclosure.
Figure 4:
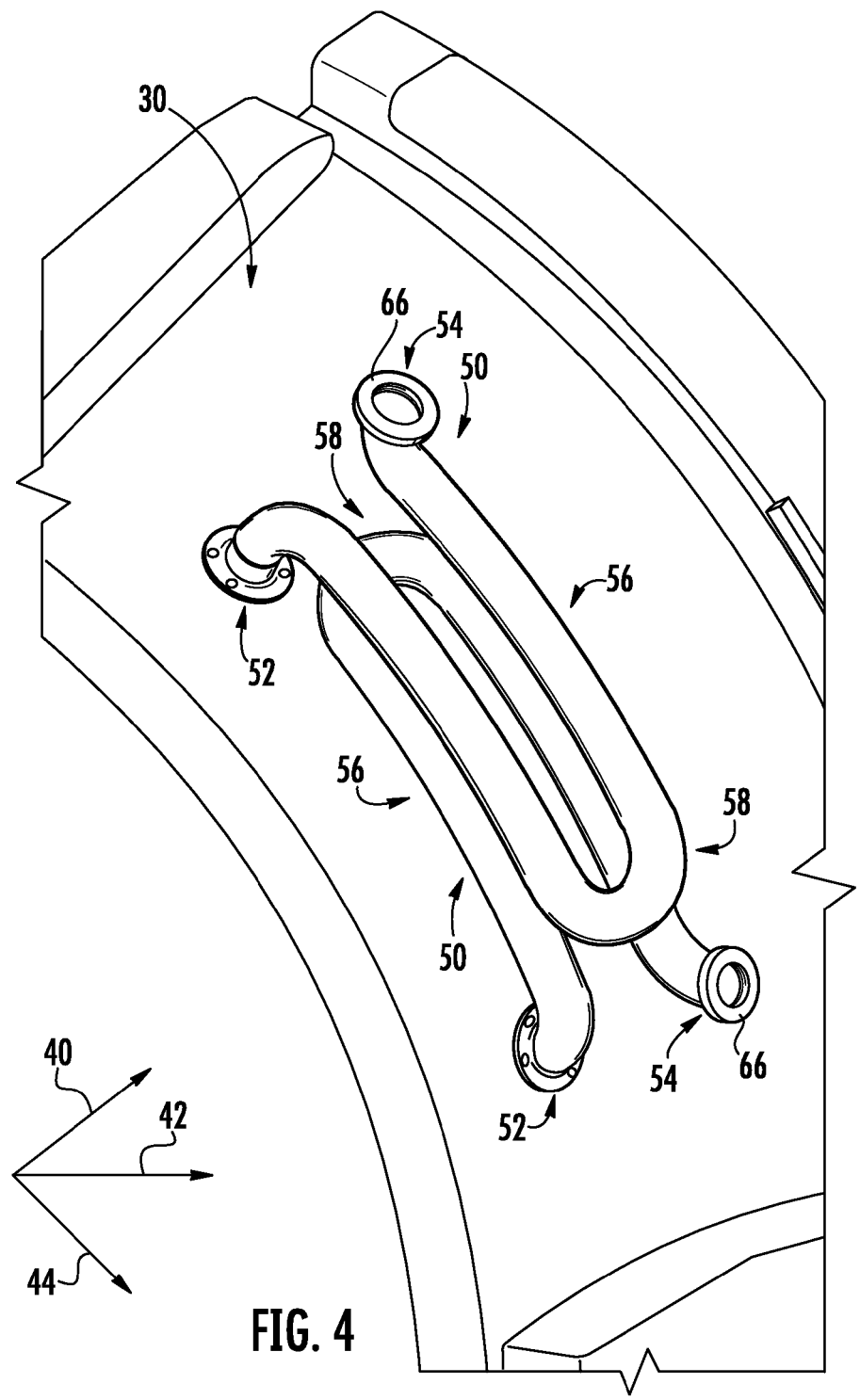
FIG. 4 is a perspective view of one embodiment of two piping assemblies connected to an inner shell according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 is a schematic diagram of a turbine system 10. The system 10 may include a compressor 12, combustor 14, and turbine 16. Further, the system 10 may include a plurality of compressors 12, combustors 14, and turbines 16. The compressor 12 and turbine 16 may be coupled by a shaft 18. The shaft 18 may be a single shaft or a plurality of shaft segments coupled together to form shaft 18. It should be understood that the turbine system according to the present disclosure may be a gas turbine system, a steam turbine system, or any other suitable turbine system.

FIGS. 4 through 7 illustrate one embodiment of an inner shell 30 and outer shell 32. The shells 30 and 32 are located in the turbine system 10, and surround various components in a section of the turbine system 10, such as stator and rotor components. For example, the shells 30 and 32 may be for a compressor 12, a turbine 16, or any other suitable section of a turbine system 10. In general, the inner shell 30 surrounds the various components, and the outer shell 32 at least partially surrounds the inner shell 32.

Various axes may be defined for the turbine system 10, or a section thereof, with respect to the shells 30 and 32, as shown. For example, a longitudinal axis 40 may be defined extending generally centrally through the shells 30 and 32. A radial axis 42 may be defined as extending radially outwardly in any direction from and with respect to the longitudinal axis 40, and a tangential axis 44 may be defined as extending tangentially with respect to the longitudinal and radial axes 40 and 42.

During operation of the system 10, the inner shell 30 and outer shell 32 may move relative to one another along and about one or more of the axes 40, 42, and 44. This movement may be caused by, for example, thermal gradients between the shells 30 and 32, or other factors that may impact the inner shell 30 and outer shell 32 during operation. Further, during operation of the system 10, cooling flows and/or other fluid flows may need to be transferred from external to the outer shell 32 to the components internal to the inners shell 30.

Thus, the present disclosure is directed to a piping assembly 50 for connecting the inner shell 30 and the outer shell 32. The piping assembly 50 allows for the inner shell 30 and outer shell 32 to move with respect to one another along or about various of the axes 40, 42, and 44. Thus, the likelihood of leakage from or damage to the piping assembly 50 due to the respective movement of the inner and outer shells 30 and 32 is reduced or eliminated.

As shown in FIGS. 2 and 4 through 8, a piping assembly 50 according to the present disclosure includes at least one inner fitting 52, at least one outer fitting 54, and an attenuation member 56. The attenuation member 56 extends between the inner fittings 52 and the outer fittings 54. Each of these components is generally hollow, thus allowing for fluid flow therethrough and therebetween. The attenuation member 56 includes at least one attenuation curve 58, which permits movement of the attenuation member 56 in at least one direction. For example, the attenuation curve 58 may permit movement of the attenuation member 56 in at least one of a longitudinal direction along the longitudinal axis 40, a radial direction along the radial axis 42, or a tangential direction along the tangential axis 44, as discussed below.

Figure 7:
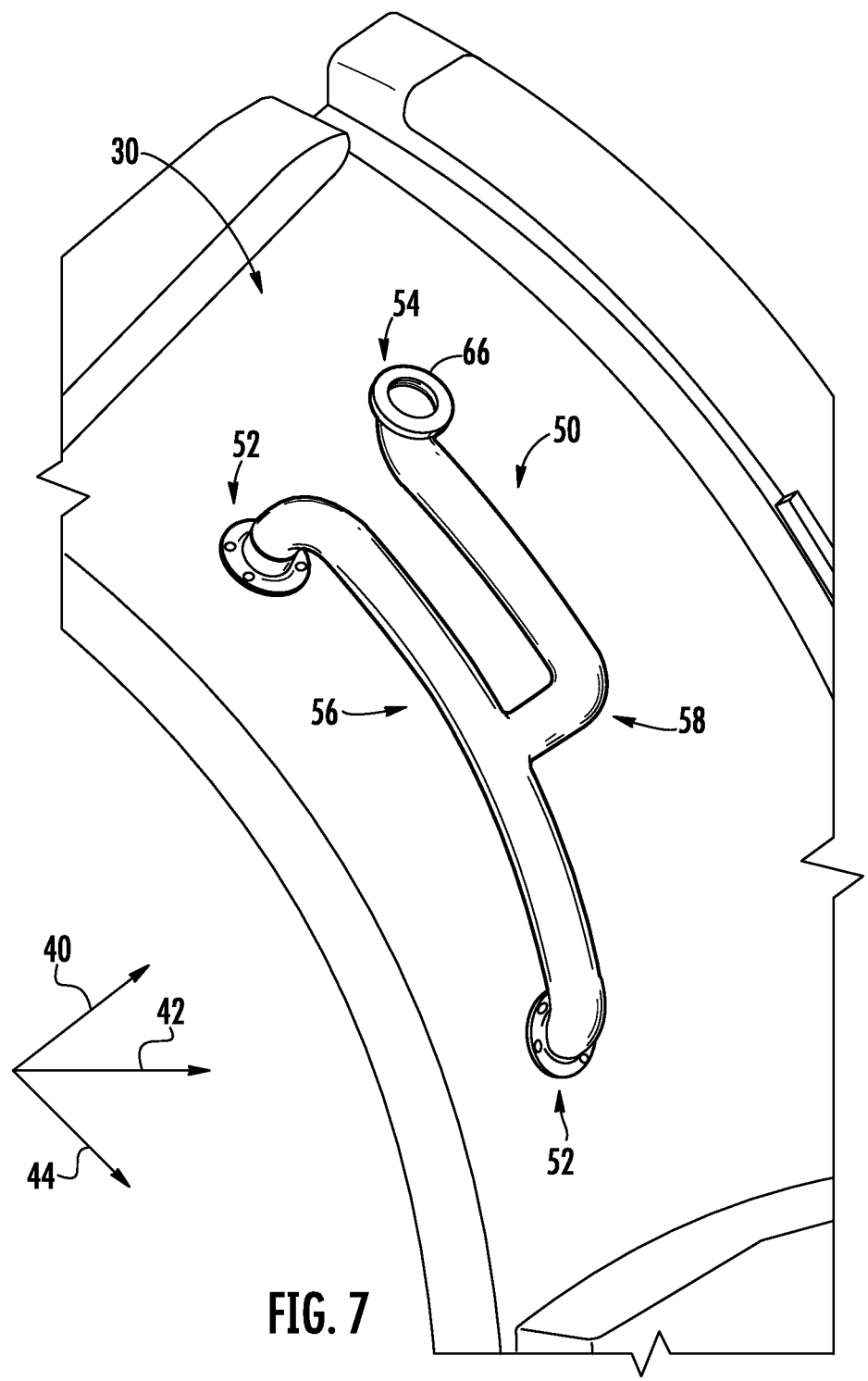
FIG. 7 is a perspective view of another embodiment of a piping assembly according to the present disclosure.
Figure 8:
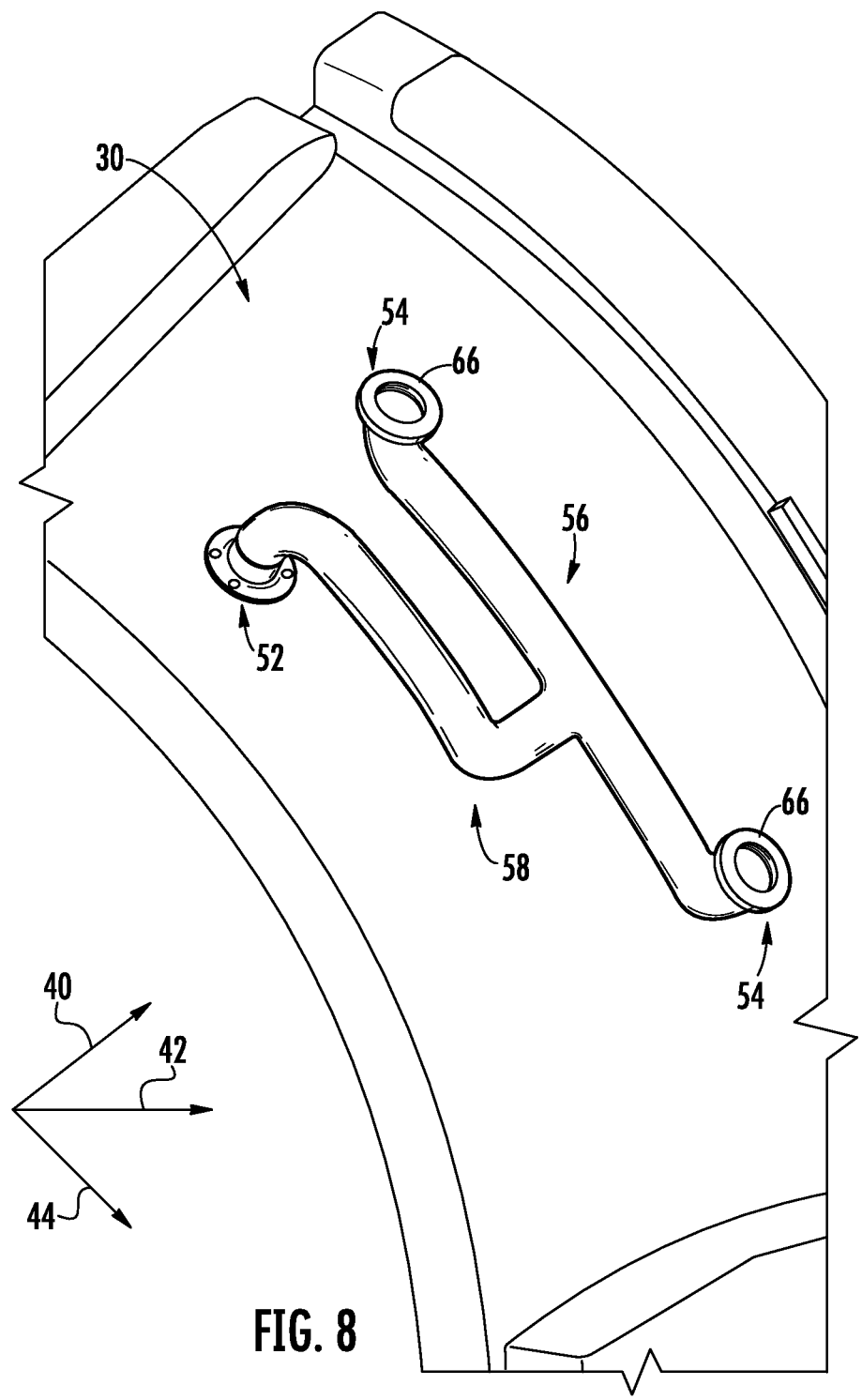
FIG. 8 is a perspective view of another embodiment of a piping assembly according to the present disclosure.

A piping assembly 50 according to the present disclosure may include one inner fitting 52, as shown in FIGS. 2, 4 through 6, and 8, two inner fittings 52, as shown in FIG. 7, three inner fitting 52, or four or more inner fittings 52. Further, the piping assembly 50 may include one outer fitting 54, as shown in FIGS. 2 through 7, two outer fittings 54, as shown in FIG. 8, three outer fittings 54, or four or more outer fittings 54. In embodiments including one or more inner fitting 52 and/or outer fitting 54, the attenuation member 56 may include a plurality of branches, as shown in FIGS. 7 and 8, and may further include a plurality of attenuation members 58 if desired or required.

As shown, each inner fitting 52 may be connected to the inner shell 30. In exemplary embodiments, an inner fitting 52 may be a flange, as shown. The flange may be mechanically fastened, using nuts and bolts, screws, nails, rivets, or the like, or may be welded or otherwise secured, to the inner shell 30. Alternatively, the inner fitting 52 may be a threaded member that is threaded for connection with mating threads on the inner shell 30, or may be otherwise suitably configured to connection to the inner shell 30. In this manner, the inner fitting 52 may be connected to the inner shell 30 such that it is in fluid communication with an aperture (not shown) defined in the inner shell 30, which may allow fluid flow therethrough and into various components within the inner shell 30.

Further, each outer fitting 54 may be connected to the outer shell 32. In exemplary embodiments, as shown in FIGS. 2 through 4 and 6 through 8, an outer fitting 52 may include outer flange 62, an insert 64, and an inner flange 66. The insert 64 may be mounted to the outer flange 62 or inner flange 66. The inner flange 66 may be mounted to an outer end of the attenuation member 56. The insert 64 may connectable to the other of the outer flange 62 or inner flange 66. For example, in exemplary embodiments, the insert 64 and outer flange 62 or inner flange 66 may be threaded components, and thus include mating threads for connection to each other, as shown by insert 64 and inner flange 66 in FIG. 3. To connect the outer fitting 54 to the outer shell 32, the inner flange 66 and, if mounted thereto, the insert 64, may be positioned adjacent to inner surface 72 of the outer shell 32 and adjacent to an aperture 68 defined in the outer shell 32. If the insert 64 is mounted thereon, the insert 64 may be extended through the aperture 68. The outer flange 62 and, if mounted thereto, the insert 64, may be connected to the inner flange 66 through the aperture 68 from outer surface 74 of the outer shell 32. Thus, after connection to the outer shell 32, the outer flange 62 may contact the outer surface 74 of the outer shell 32, the inner flange 66 may contact the inner surface 72 of the outer shell 72, and the insert 64 may extend between the inner flange 66 and outer flange 62 and through the aperture 68. During assembly, the insert 64 may be extended through the aperture 68 from either internal or external to the outer shell 72, as desired or required. Thus, the outer fitting 54 may be connected to the outer shell 32. In some embodiments, the outer flange 62 may further be mechanically fastened, using nuts and bolts, screws, nails, rivets, or the like, or may be welded or otherwise secured, to the outer shell 32, such as to the outer surface 74 of the outer shell 32.

Alternatively, the outer fitting 54 may simply be a flange that is mechanically fastened, welded, or otherwise secured to the outer shell 32, such as to the inner surface 72 or outer surface 74 of the outer shell 32. In still further alternative embodiments, the outer fitting 54 may be a threaded member that is threaded for connection with mating threads on the outer shell 32, or may be otherwise suitably configured to connection to the outer shell 32. In this manner, the outer fitting 54 may be connected to the outer shell 32 such that it is in fluid communication with aperture 68 defined in the outer shell 32, which may allow fluid flow therethrough.

The inner fittings 52 and outer fittings 54 may be fixidly connectable to the respective inner shell 30 and outer shell 32, or may be movably connectable. For example, in exemplary embodiments, an inner fitting 52 may be fixidly connected to the inner shell 30. In these embodiments, the inner fitting 52, once connected to the inner shell 30, may generally be not movable in any direction with respect to the inner shell 30 during normal operation of the system 10. If the inner fitting 52 is mechanically fastened or welded, for example, to the inner shell 30, the inner fitting 52 if fixidly connected. In some embodiments, an outer fitting 54 may additionally be fixidly connected to the outer shell 32. In exemplary embodiments, however, the outer fitting 54 may be movably connected to the outer shell 32. In these embodiments, the outer fitting 54, once connected to the outer shell 32, may still be movable in at least one direction with respect to the outer shell 32 during normal operation of the system 10. For example, in some embodiments, the outer fitting 54 may be movably connected such that movement is allowed in the radial direction along radial axis 42. In these embodiments, the bolts connecting the outer fitting 54 to the outer shell 32 may be loosened to allow for radial movement, or the space between the outer flange 62 and inner flange 66 of the outer fitting 54 may be larger than the thickness of the outer shell 32, such that the outer fitting 54 slides radially in aperture 68. This movement in the radial direction may accommodate loading of the piping assembly 50 in the radial direction, thus preventing or reducing the likelihood of damage to the piping assembly 50 during operation of the system 10. Additionally or alternatively, the outer fitting 54 may be movably connected such that movement is allowed in the longitudinal direction along longitudinal axis 40, thus accommodating loading in the longitudinal direction, and/or may be movably connected such that movement is allowed in the tangential direction along tangential axis 44, thus accommodating loading in the tangential direction. Still further, it should be understood that any inner fitting 52 and/or outer fitting 54 may be fixidly connected or movably connected in the piping assembly 50.

As discussed above, the attenuation member 56 extends between the inner fittings 52 and outer fittings 54 and includes at least one attenuation curve 58. The attenuation curve 58 permits movement of the attenuation member 56 in at least one of a longitudinal direction along longitudinal axis 40, a radial direction along radial axis 42, or a tangential direction along tangential axis 44. For example, the attenuation member 56 shown in FIGS. 2 and 4 through 6 includes an attenuation curve 58 that permits movement of the attenuation member 56 in both the longitudinal direction and the radial direction. The attenuation curve allows the inner portion 82 of the attenuation member 56, which extends between the inner fitting 52 and the attenuation curve 58, and the outer portion 84 of the attenuation member 56, which extends between the outer fitting 54 and the attenuation curve 58, to move with respect to each other in the longitudinal and radial directions. Similarly, the attenuation member 56 shown in FIGS. 7 and 8 includes an attenuation curve 58 that permits movement of the attenuation member 56 in at least the longitudinal direction. Further it should be understood that attenuation curves 58 may be included that permit movement in the tangential direction, if desired or required. By allowing such movement of the attenuation member 56, the inner and outer fittings 52 and 54 are allowed to move with respect to each other when the inner and outer shells 30 and 32 move with respect to each other. The piping assembly 50 of the present disclosure thus reduces or prevents the likelihood of leakage or damage during operation of the turbine system 10.

Figure 5:
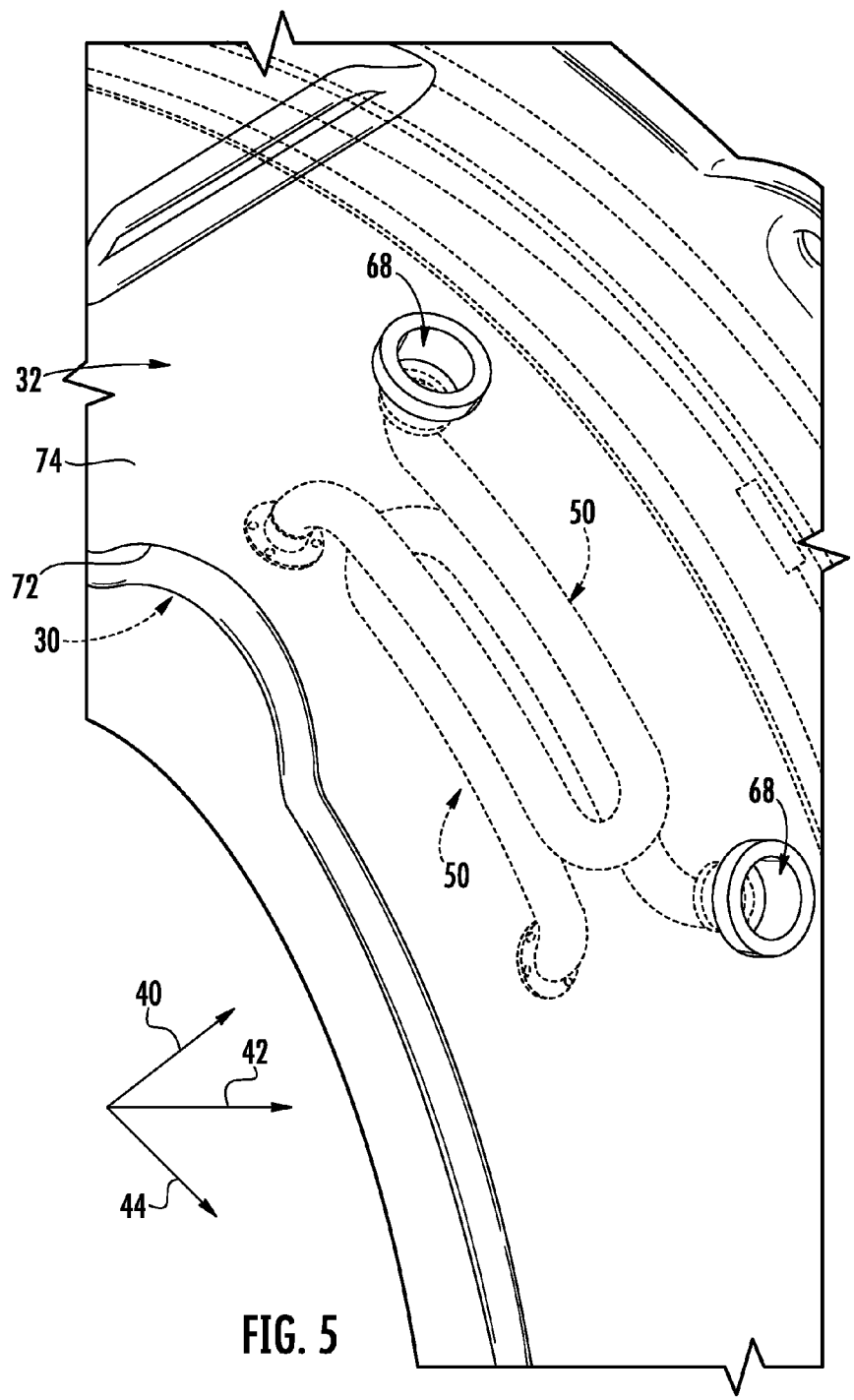
FIG. 5 is a perspective view of one embodiment of two piping assemblies connected to an inner shell, the inner shell coupled to an outer shell, according to the present disclosure.
Figure 6:
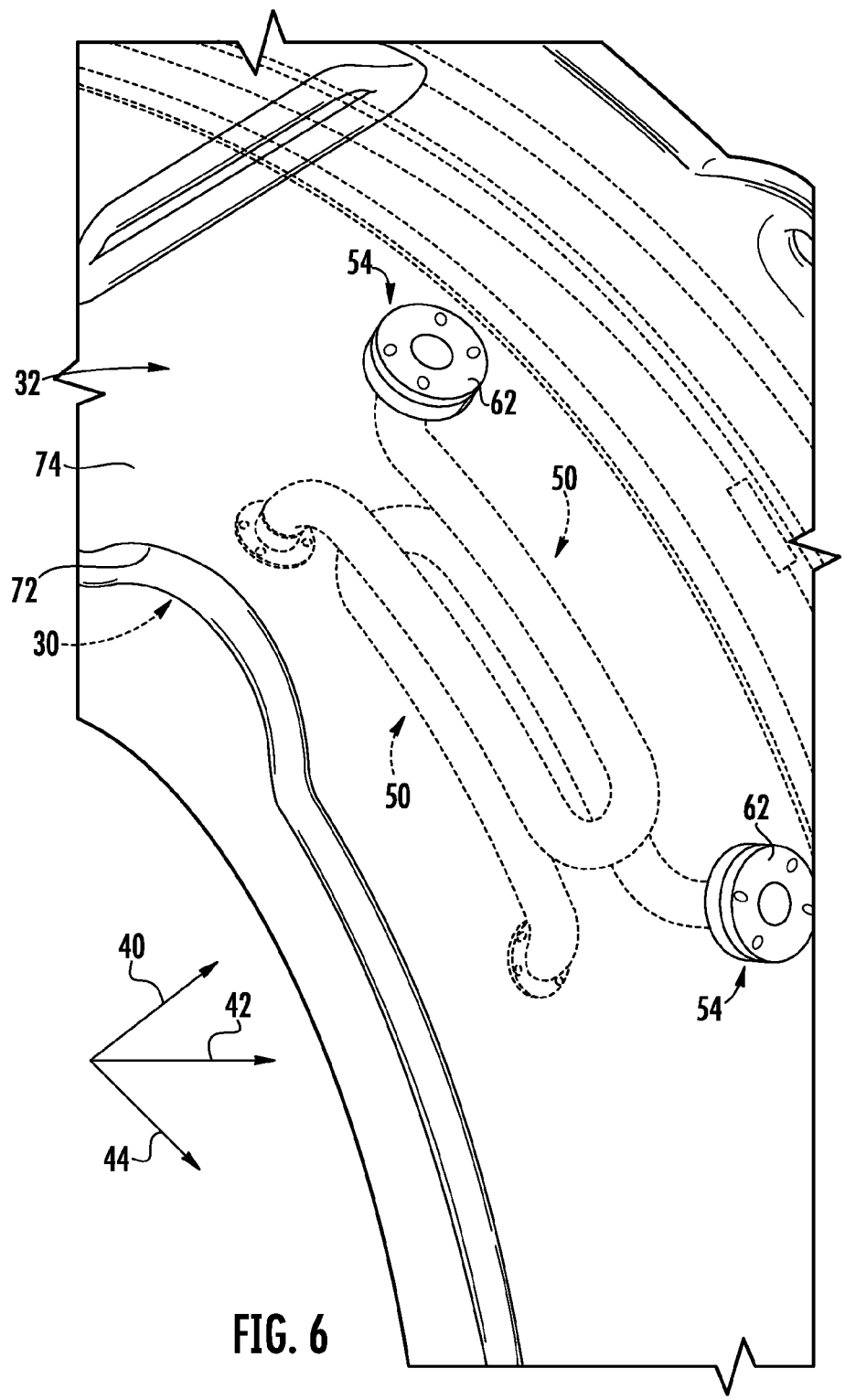
FIG. 6 is a perspective view of one embodiment of two piping assemblies connected to an inner shell and outer shell according to the present disclosure.

The present disclosure is further directed to a method for connecting an inner shell 30 and an outer shell 32 in a turbine system 10. The method may include connecting at least one inner fitting 52 of a piping assembly 50 to the inner shell 30, as discussed above and shown in FIG. 4. The method may further include coupling the inner shell 30 with the outer shell 32, as shown in FIG. 5. To couple the inner and outer shells 30 and 32, the inner shell 30 may be rolled or otherwise transferred into the outer shell 32, or the outer shell 32 may be rolled or otherwise transferred around the inner shell 30, such that the outer shell 32 at least partially surrounds the inner shell 30, as discussed above. Further, the method may include connecting at least one outer fitting 54 of the piping assembly 50 to the outer shell 32, as discussed above and shown in FIG. 6. The inner fittings 52 and outer fittings 54 may be fixidly or movably connected to the inner shell 30 and outer shell 32, respectively, and the attenuation member 56 of the piping assembly 50 may permit movement in at least one direction, as discussed above.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A piping assembly for connecting an inner shell and an outer shell in a turbine system, the piping assembly comprising:
    an inner fitting for connection to the inner shell;
    an outer fitting for connection to the outer shell; and
    an attenuation member comprising an inner portion coupled at a first end to the inner fitting, a U-shaped attenuation curve and an outer portion coupled at a second end to the outer fitting, wherein both the inner portion and the outer portion extend circumferentially about the inner shell arid the outer shell substantially parallel to each other and substantially perpendicular to a longitudinal axis of the turbine system, the attenuation curve permitting movement of the attenuation member in at least one of a longitudinal direction, a radial direction, or a tangential direction.

2. The piping assembly as in claim 1, wherein the attenuation curve permits movement of the attenuation member in a plurality of directions.

3. The piping assembly as in claim 2, wherein the directions include the longitudinal direction and the radial direction.

4. The piping assembly of claim 1, further comprising a plurality of inner fittings.

5. The piping assembly of claim 1, further comprising a plurality of outer fittings.

6. The piping assembly of claim 1, wherein the inner fitting is fixedly connectable to the inner shell.

7. The piping assembly of claim 1, wherein the outer fitting is movably connectable to the outer shell to accommodate loading in at least one of the longitudinal direction, the radial direction, or the tangential direction.

8. The piping assembly of claim 7, wherein the outer fitting is movably connectable to the outer shell to accommodate loading in the radial direction.

9. The piping assembly of claim 1, wherein the outer fitting comprises an outer flange, an insert, and an inner flange.

10. A turbine system, comprising:
    an inner shell;
    an outer shell at least partially surrounding the inner shell; and
    a piping assembly connecting the inner shell and the outer shell, the piping assembly comprising:
        a first inner fitting connected to the inner shell;
        a second inner fitting connected to the inner shell;
        an outer fitting connected to the outer shell; and
        an attenuation member comprising an inner portion coupled at a first end to the first inner fitting and at a second end to the second inner fitting, an attenuation curve which extends between the inner portion and the outer portion, wherein the inner portion and the outer portion extend circumferentially about the inner shell and the outer shell substantially parallel to each other and substantially perpendicular to a longitudinal axis of the turbine system, the attenuation curve extending circumferentially and longitudinally between the inner and outer portions, wherein the attenuation curve permits movement of the attenuation member in at least one of a longitudinal direction, a radial direction, or a tangential direction.

11. The turbine system of claim 10, wherein the attenuation curve permits movement of the attenuation member in a plurality of directions.

12. The turbine system of claim 11, wherein the directions include the longitudinal direction and the radial direction.

13. The turbine system of claim 10, wherein the inner fitting is fixedly connected to the inner shell.

14. The turbine system of claim 10, wherein the outer fitting is movably connected to the outer shell to accommodate loading in at least one of the longitudinal direction, the radial direction, or the tangential direction.

15. The turbine system of claim 14, wherein the outer fitting is movably connected to the outer shell to accommodate loading in the radial direction.

16. The turbine system of claim 10, wherein the outer fitting comprises an outer flange, an insert, and an inner flange.

17. The turbine system of claim 16, wherein the insert and inner flange each include mating threads.

18. The turbine system of claim 16, wherein the outer flange contacts an outer surface of the outer shell, the inner flange contacts an inner surface of the outer shell, and the insert extends between the outer flange and the inner flange.

19. A method for connecting an inner shell and an outer shell in a turbine system, the method comprising:
    connecting an inner fitting of a piping assembly to an inner shell, the piping assembly comprising the inner fitting, an outer fitting, and an attenuation member extending therebetween, the attenuation member comprising an inner portion coupled at a first end to the inner fitting, an attenuation curve and an outer portion coupled at a second end to the outer fitting, wherein both of the inner portion and the outer portion extend circumferentially about the inner shell and the outer shell substantially parallel to each other and substantially perpendicular to a longitudinal axis of the turbine system, the attenuation curve permitting movement of the attenuation member in at least one of a longitudinal direction, a radial direction, or a tangential direction, the outer fitting comprising an outer flange, an insert, and an inner flange;
    coupling the inner shell with an outer shell;
    inserting the insert of the piping assembly through the outer shell; and
    connecting the outer fitting to the outer shell.

20. The method of claim 19, wherein the inner fitting is fixedly connected to the inner shell and the outer fitting is movably connected to the outer shell.

* * * * *

UNITED STATES PATENT AND TRADEMARK OFFICE
CERTIFICATE OF CORRECTION

| | | |
|---|---|---|
| PATENT NO. | : 8,915,701 B2 | Page 1 of 1 |
| APPLICATION NO. | : 13/227907 | |
| DATED | : December 23, 2014 | |
| INVENTOR(S) | : Black et al. | |

It is certified that error appears in the above-identified patent and that said Letters Patent is hereby corrected as shown below:

In the specification

In Column 3, Line 63, delete "attenuation members 58" and insert -- attenuation members 56 --, therefor.

In the claims

In Column 6, Line 29, in Claim 1, delete "arid" and insert -- and --, therefor.

In Column 6, Line 35, in Claim 2, delete "as in claim" and insert -- of claim --, therefor.

In Column 6, Line 38, in Claim 3, delete "as in claim" and insert -- of claim --, therefor.

Signed and Sealed this
Fifth Day of May, 2015

Michelle K. Lee
*Director of the United States Patent and Trademark Office*